United States Patent [19]

Kugioka

[11] Patent Number: 4,857,817
[45] Date of Patent: Aug. 15, 1989

[54] DRIVE CIRCUIT FOR STEPPING MOTOR

[75] Inventor: Michihiro Kugioka, Yokohama, Japan

[73] Assignees: Canon Kabushiki Kaisha; Canon Seki Kabushiki Kaisha, both of Tokyo, Japan

[21] Appl. No.: 148,690

[22] Filed: Jan. 26, 1988

[30] Foreign Application Priority Data

Jan. 30, 1987 [JP] Japan .............................. 62-020169[U]

[51] Int. Cl.$^4$ .............................................. H02P 8/00
[52] U.S. Cl. ..................................... 318/696; 318/685
[58] Field of Search ................................ 318/696, 685

[56] References Cited

U.S. PATENT DOCUMENTS

| 3,757,193 | 9/1973 | Inaba et al. | 318/696 |
| 4,389,605 | 6/1983 | Noda | 318/696 |
| 4,639,084 | 1/1987 | Kugioka | 350/255 |
| 4,642,544 | 2/1987 | Furumura et al. | 318/696 |

Primary Examiner—William M. Shoop, Jr.
Assistant Examiner—Saul M. Bergmann
Attorney, Agent, or Firm—Fitzpatrick, Cella, Harper & Scinto

[57] ABSTRACT

In this invention, an excitation current is switched in accordance with a change in number of phases so as to reduce an excitation current per phase in a 2-phase mode to be smaller than that in a 1-phase mode. The excitation current in the 2-phase mode is set to be about 0.6 to 0.8 times larger than that in the 1-phase mode, so that a constant torque is always generated.

4 Claims, 3 Drawing Sheets

DRIVE CIRCUIT FOR STEPPING MOTOR

BACKGROUND OF THE INVENTION

1. Field of the Invention

The present invention relates to a drive circuit for a stepping motor and, more particularly, to a drive circuit for a stepping motor, which employs a method, such as a 1–2 phase excitation mode, wherein 1-and 2-phase excitation modes are alternately repeated.

2. Related Background Art

In a stepping motor, pole pieces of a stator having a plurality of excitation coils and magnetic poles of a rotor are arranged to face each other. A pulse current (excitation current) is supplied to the excitation coils in the predetermined order to sequentially rotate the rotor by a predetermined angle (step angle).

Therefore, a rotational angle (amount of motor rotation) of the rotor is proportional to the number of pulses of the drive current, and a rotational speed is proportional to its frequency.

Drive circuit modes of a stepping motor of this type include a 1-phase excitation mode for sequentially exciting a motor by one phase, a 2-phase excitation mode for sequentially exciting a motor by two phases, and a 1–2 phase excitation mode for alternately repeating 1- and 2-phase excitation modes.

In the 1- and 2-phase excitation modes, a motor can always be driven by a constant excitation current even if a phase is switched. Therefore, an average value of a torque is theoretically constant.

In the 1–2 phase excitation mode, since the 1- and 2-phase excitation modes alternately appear, a large variation in torque (theoretically, 41%) occurs, resulting in vibration and noise. This is because a drive current in the 2-phase mode for energizing two coils is larger than (about twice) a drive current in the 1-phase mode for energizing one coil, and an output torque varies in proportion thereto.

Another drive method has been disclosed in Japanese Patent Laid-Open No. 156195. In this method, an output torque is maintained constant by controlling a supply current. Then step-out is prevented even if changes in gravity or static friction occur due to variations in load or aging.

In the conventional method, a supply current is controlled to stabilize an output torque. The method is performed when a pulse rate is changed to change a speed. Therefore, when a motor is driven at a given constant speed between high and low speeds, a constant current flows. Thus, in the 1- and 2-phase excitation modes, a torque is kept constant, as described above. However, in the 1–2 phase excitation mode, even if a constant current is supplied, a variation in torque undesirably occurs.

The conventional methods aim at stabilization of a torque when the speed of the motor is changed but cannot eliminate variations in torque when the 1- and 2-phase modes are switched in the 1-2 phase excitation mode.

U.S. Pat. No. 3,757,193 discloses a drive circuit for a pulse motor, which switches excitation currents. However, in this patent, excitation currents are switched in rotating and stationary states of the rotor, but cannot eliminate variations in torque when the 1- and 2-phase modes are switched in the 1-2 phase excitation mode.

SUMMARY OF THE INVENTION

It is an object of the present invention to provide a drive curcuit for a stepping motor which is free from a problem in a conventional 1–2 phase excitation stepping motor drive method, can eliminate or remove variations in torque by a simple arrangement, and can reduce vibration and noise.

The above and other objects of the present invention will become apparent from the following detailed description of the preferred embodiments.

DESCRIPTION OF THE PREFERRED EMBODIMENTS

Figure 5:
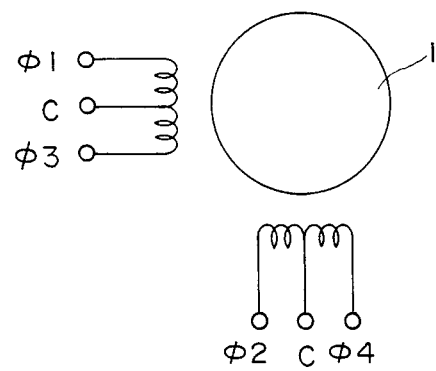
FIG. 5 is a view illustrating a stepping motor suitable for carrying out the present invention.

FIG. 5 illustrates a stepping motor suitable for carrying out the present invention. As illustrated, a plurality of (four) excitation ceils $\phi 1$, $\phi 2$, $\phi 3$, and $\phi 4$ are arranged around a magnet rotor 1 comprising a permanent magnet which is magnetized in a predetermined pattern in the circumferential direction. These excitation coils are wound around a stator (motor) facing the circumferential surface of the magnet rotor 1 at a predetermined gap.

Figure 1:
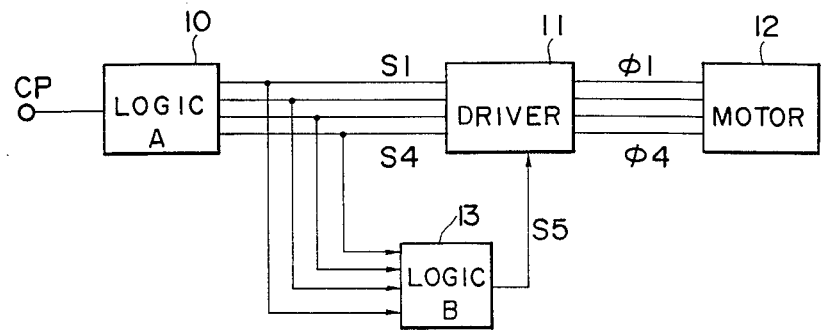
FIG. 1 is a block diagram showing a schematic arrangement of a drive circuit for a stepping motor.

FIG. 1 is a block diagram showing a schematic arrangement of a drive circuit for a stepping motor according to the present invention.

In FIG. 1, a LOGIC·A 10 receives a clock pulse CP to constitute a distribution circuit. The LOGIC·A 10 outputs control signals S1, S2, S3, and S4 for sequentially driving respective excitation phases of the motor at predetermined timings.

A driver 11 drives the excitation phases of a motor 12. A LOGIC·B 13 constitutes a circuit for setting a current value in a 2-phase mode (or 1-phase mode).

The control signals Sl to S4 output from the LOGIC·A 10 are supplied to both the driver 11 and the LOGIC·B 13, and a current value switching signal S5 is supplied from the LOGIC B to the driver 11.

Figure 2:
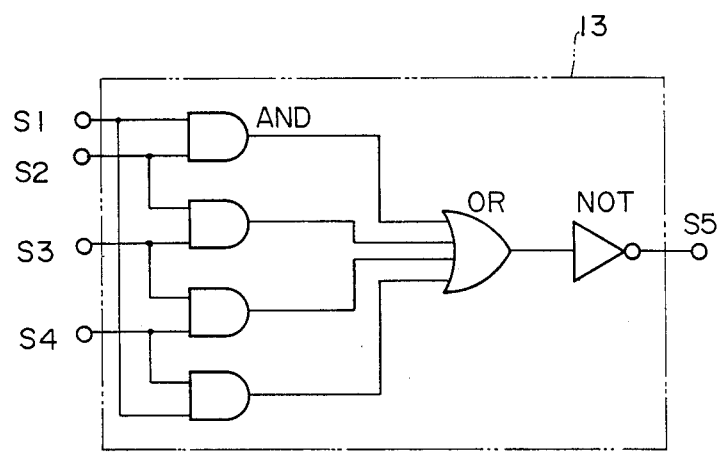
FIG. 2 is a circuit diagram of a LOGIC·B in FIG. 1.

FIG. 2 shows a circuit arrangement of the LOGIC B 13 shown in FIG. 1.

In FIG. 2, the LOGIC·B comprises four AND gates which receive predetermined compinations of drive signals S1 to S4 of the excitation coils Q1 to Q4, an OR gate connected to the output terminals of the AND gates, and a NOT circuit connected to the output terminal of the OR gate. The LOGIC·B outputs the current value switching signal (driver control signal) S5 which is ON in the 1-phase excitation mode and is OFF in the 2-phase excitation mode.

Figure 3:
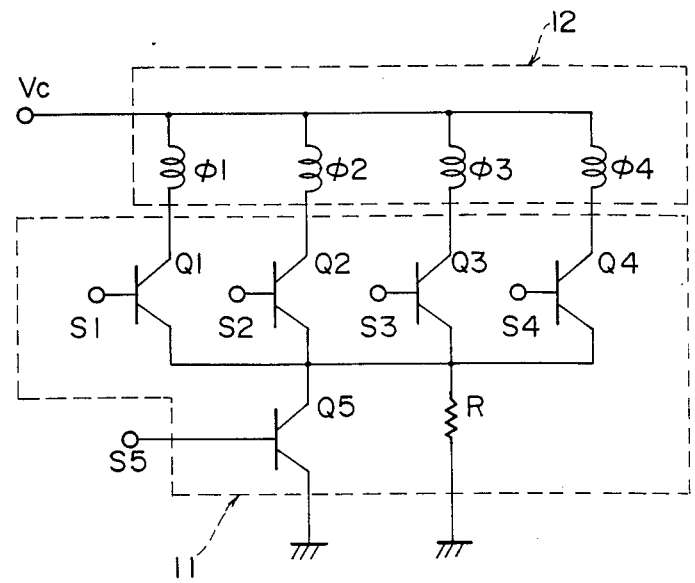
FIG. 3 is a circuit diagram showing a detailed circuit arrangement of a driver in FIG. 1.

FIG. 3 shows a detailed circuit arrangement of the driver (coil drive circuit) 11 is FIG. 1.

In FIG. 3, the driver 11 comprises switching transistors Q1, Q2, Q3, and Q4 which are respectively connected in series with the excitation coils $\phi 1$, $\phi 2$, $\phi 3$, and $\phi 4$ of the motor 12, a switching transistor Q5 which is connected in series with these switching transistors Q1 to Q4, and a current limiting resistor R which is connected in parallel wth the switching transistor Q5. The switching transistors Q1 to Q5 are ON/OFF-controlled by the control signals S1 to S5, so that ON/OFF and level of the drile current from a power supply VC to the excitation coils $\phi 1$ to $\phi 4$ are controlled.

More specifically, the excitation coils $\phi 1$ to $\phi 4$ are driven when the corresponding control signals S1 to S4 are at logic "1" (ON), and are turned off (deenergized) when the corresponding control signals S1 to S4 are at logic "0" (OFF).

When the current value switching signal S5 is at logic "1" (ON) and the transister $\phi 5$ is ON (closed), a normal (100%) current is supplied to the excitation coils $\phi 1$ to $\phi 4$. When the signal S5 is at logic "0" and the transistor Q5 is OFF (open) an excitation current is supplied through the current limiting resistor R. Thus, the current to be supplied to the excitation coils $\phi 1$ to $\phi 4$ is limited to a value smaller than (0.6 to 0.8 times) the normal value.

The current value switching signal S5 is set at logic "1" (ON) in the -phase made, and ss set at logic "0" (OFF) in the 2-phase mode.

Therefore, the resistance of the current limiting resistor R is set so that a current value in the 2-phase mode becomes about 0.6 to 0.8 times larger than that in the 1-phase mode. Thus, a ratio of current values per phase flowing in the 1- and 2-phase modes can be set to be about 1:0.7. Therefore, variations in torque value can be substantially eliminated.

Figure 4:
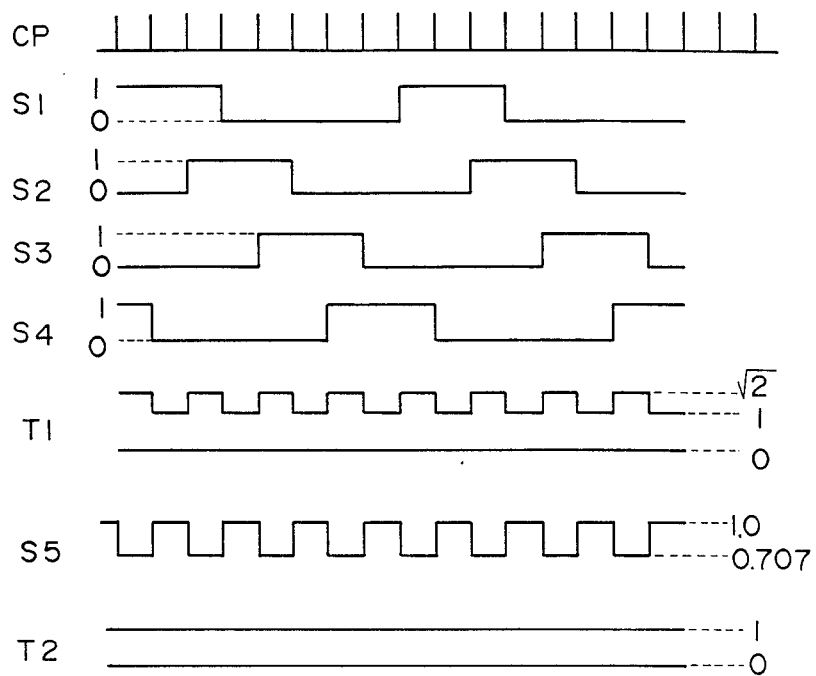
FIG. 4 is a timing chart showing an operation of the drive circuit shown in FIGS. 1 to 3.

FIG. 4 is a timing chart snowing an operation of the drive circuit shown in FIGS. 1 to 3.

In FIG. 4, clock pulses CP determine operation unit intervals. The excitation coils $\phi 1$ to $\phi 4$ are driven in the 1-2 phase excitation mode at timings S1 to S4. When no current value switching operation is performed (related art), a torque value (or an excitation current value) varies as indicated by T1 in FIG. 4. The current value switching signal applied rrom the LOGIC·B 13 to the driver 11 is turned on/off at timings represented by S5. When the setting value of a current is changed in the 1- and 2-phase modes in accordance with the current value switching signal S5, i.e.. when variations in torque are eliminated by the method of the present invention, a torque (excitation current) T2 is obtained.

According to the drive circuit for the stepping motor described with reference to FIGS. 1 to 4, the setting value of the excitation current is changed in accordance with the number of phases tp be excited so that an excitation current in the 2-phase mode becomes about 0.6 to 0.8 times larger than that in the 1-phase mode. Therefore, substantially the same torque value which is substantially proportional to the excitation current can be obtained in the 1- and 2-phase modes. Thus, a drive circuit which can eliminate vibration and noise due to variations in torque can be ootained. In addition, a simple circuit, i.e., the LOGIC·B 13 need only be installed to provide a drive circuit which can effectively eliminate variations in torque.

In the above embodiment, as shown in FIG. 3, a setting value switching means of an excitation current is constituted by the switching transistor Q5 and the current limiting resistor R. However, the setting value switching means may be constituted by other current, limiting elements such as a thyristor, an IC (inte circuit), and the like.

As can be apparent from the above description, according to the present invention, a current value switching means is arranged, which switches an excitation current in accordance with a change in number of phases so as to reduce an excitation current per phase in a 2-phase mode to be smaller than that in a 1-phase mode. Therefore, by adding a simple circuit, a drive circuit for the stepping motor which can eliminate variations in torque in the 1-2 phase excitation mode to reduce vibration and noise can be obtained.

I claim:

1. A stepping motor for alternately repeating 1- and 2-phase excitation modes comprising:
   drive signal generating means for sequentially generating a drive signal so that the 1- and 2-phase excitation modes are alternately repeated;
   a plurality of excitation coils which are driven in the 1- or 2-phase excitation mode in accordance with the drive signal from said drive signal generating means;
   switching signal generating means for generating a switching signal corresponding to the 1- or 2-phase excitation mode in accordance with the drive signal from said drive signal generating means; and
   setting means for switching and setting an excitation current value to said excitation coils in accordance with the 1- or 2-phase excitation mode,
   wherein said setting means switches and sets said excitation current value by changing resistance, said setting means having a first circuit and a second circuit for changing said excitation current value by changing resistance, and said first circuit and said second circuit being switched in accordance with said switching signal.

2. stepping motor according to claim 1, wherein said first circuit of said setting means is switched and set by said switching signal generating means in said 1-phase excitation mode and said second circuit of said setting means is switched and set by said switching signal generating means in said 2-phase excitation mode, and wherein an excitation current in the 2-phase excitation mode becomes about 0.6 to 0.8 times larger than that in the 1-phase excitation mode.

3. A motor according to claim 1, wherein said switching signal generating means has a gate circuit, and a signal corresponding to an output from said gate circuit is output as the switching signal.

4. A stepping motor according to claim 3, wherein said setting means has a switching circuit for switching an excitation current, and said switching circuit is turned on/off by said switching signal, and wherein said first circuit is switched and set when said switching circuit is turned to one state of on and off and said second circuit is switched and set when said switching circuit is turned to the other state of on and off.

* * * * *

UNITED STATES PATENT AND TRADEMARK OFFICE
CERTIFICATE OF CORRECTION

PATENT NO. : 4,857,817
DATED : August 15, 1989
INVENTOR(S) : MICHIHIRO KUGIOKA

It is certified that error appears in the above-identified patent and that said Letters Patent is hereby corrected as shown below: On the title page:

IN [73] ASSIGNEES

"Canon Seki Kabushiki Kaisha," should read
--Canon Seiki Kabushiki Kaisa,--.

COLUMN 1

Line 9, "1-and 2-phase" should read --1- and 2-phase--.

COLUMN 2

Line 4, "curcuit" should read --circuit--.
Line 28, "excitation ceils $\phi1$, $\phi2$, $\phi3$, and $\phi4$" should read --excitation coils $\phi1$, $\phi2$, $\phi3$, and $\phi4$--.
Line 49, "LOGIC B" should read --LOGIC·B--.
Line 50, "LOGIC B" should read --LOGIC·B--.
Line 53, "compinations" should read --combinations--.
Line 54, "excitation coils Q1 to Q4," should read --excitation coils $\phi1$ to $\phi4$,-- and "OR" should read --OR--.
Line 59, "ON" should read --ON--.
Line 62, "is" should read --in--.

COLUMN 3

Line 4, "drile" should read --drive--.
Line 12, "transister $\phi5$" should read --transistor Q5--.
Line 21, "-phase made," should read --1-phase mode,-- and "ss" should read --is--.
Line 38, "rrom" should read --from--.
Line 48, "excited" should read --excited,--.
Line 55, "ootained." should read --obtained.--.

UNITED STATES PATENT AND TRADEMARK OFFICE
CERTIFICATE OF CORRECTION

PATENT NO. : 4,857,817
DATED : August 15, 1989
INVENTOR(S) : MICHIHIRO KUGIOKA

Page 2 of 2

It is certified that error appears in the above-identified patent and that said Letters Patent is hereby corrected as shown below:

COLUMN 4

Line 2, "current," should read --current--.
Line 3, "IC (inte circuit)," should read
      --IC (integrated circuit)--.
Line 5, "can be" should read --is--.
Line 39, "stepping motor" should read
      --A stepping motor--.

Signed and Sealed this

Twenty-third Day of October, 1990

Attest:

HARRY F. MANBECK, JR.

*Attesting Officer*   *Commissioner of Patents and Trademarks*

UNITED STATES PATENT AND TRADEMARK OFFICE
CERTIFICATE OF CORRECTION

PATENT NO. : 4,857,817

DATED : August 15, 1989

INVENTOR(S) : MICHIHIRO KUGIOKA

It is certified that error appears in the above-identified patent and that said Letters Patent is hereby corrected as shown below:

COVER PAGE:

[73] Assignee

"Canon Seiki Kabushiki Kaisa," should read
--Canon Seiki Kabushiki Kaisha,--.

Signed and Sealed this

Nineteenth Day of January, 1993

Attest:

DOUGLAS B. COMER

*Attesting Officer*  *Acting Commissioner of Patents and Trademarks*